Dec. 17, 1963 R. D. GAFFORD ETAL 3,114,610
CONTINUOUS SAMPLING GAS ANALYZER
Filed May 17, 1961 2 Sheets-Sheet 1

INVENTORS
ROBERT D. GAFFORD
PETER ROSENBAUM
BY
Earl C. Hancock
AGENT

INVENTOR.
ROBERT D. GAFFORD
PETER ROSENBAUM
BY
Earl C. Hancock
AGENT

3,114,610
CONTINUOUS SAMPLING GAS ANALYZER
Robert D. Gafford and Peter Rosenbaum, both of Arapahoe County, Colo., assignors to Martin-Marietta Corporation, a corporation of Maryland
Filed May 17, 1961, Ser. No. 111,426
4 Claims. (Cl. 23—255)

This invention relates to continuous gas sampling and analyzing devices and more particularly to devices for continuously measuring the partial pressure of a constituent of a gas which constituent produces acidic or basic solutions.

In recent years it has become increasingly important to be able to continuously determine the constituents of the atmosphere within an enclosed volume. The particular problem which has brought interest in this area to a focus is the need to determine the carbon dioxide concentration in the cabin of a manned space vehicle. The atmosphere of a well ventilated room has been found to contain approximately .03% carbon dioxide but the air exhaled by a human being generally comprises about 4.5% $CO_2$. It has further been found that a difference of 5% $CO_2$ content over a period of 9 minutes is also the difference between usefulness and unconsciousness of a human being. Further $CO_2$ concentration can even result in death. Accordingly, means must be included in the vehicle to constantly monitor the $CO_2$ content of the cabin and to automatically "scrub" the atmosphere whenever the $CO_2$ concentration approaches levels that might seriously impair human efficiency.

Proir to the advent of space flight, the known methods of $CO_2$ analysis were generally adequate. One of these prior art methods is the infra-red analyzer that functioned on the infra-red absorption characteristics of $CO_2$. Another known device is the thermal conductivity analyzer that utilized the difference between $CO_2$ conductivity and that of other gases. Still another prior art device is the gas chromatograph which usually employed a column packed with materials that separate components by passing them through the column at different rates. However, none of the foregoing prior art devices meet all of the requirements for space purposes including minimum size, weight and power consumption with maximum accuracy and reliability of calibration.

It is known that certain gases harmful to human beings can be made to produce acidic or basic solutions. The measure of the ability of such a gas to produce acidic or alkaline solutions is generally referred to as its pH factor. This pH factor concerns the measure of disassociated or free hydrogen ions in the solution. Technically, the term pH is an expression of the negative logarithm of the hydrogen ion concentration in a solution. This means that pH is simply a logarithmic index. Typically, a pH of one is a highly acidic solution, a pH of seven (7) is neutral (such as water), and a pH of fourteen (14) is a highly basic or alkaline solution. It is also known that certain dyes are pH sensitive so that the light absorption spectrum thereof will vary in proportion to the pH of the solution present within the dye. Thus the transparency of a solution containing such a pH sensitive dye will change when a soluble gas is bubbled through the solution so as to change the pH thereof. In the laboratory, simple observation of the color of the dye-containing solution is often sufficient but the bubbling arrangement becomes highly impractical if not impossible in a zero-gravity situation.

Accordingly, the present invention provides a simple, light-weight device capable of continuously monitoring the atmosphere of an enclosed volume without the need for a gravity field being present. The device is a novel arrangement which advantageously employs the optical characteristics of a pH sensitive dye for providing an indication of the presence of a gas that in solution will have an alkaline or acidic pH factor. In addition, the device can be calibrated to produce an indication of the relative concentration of such a gas in the atmosphere. By relatively simple supplementary structure, the device can be made completely automatic even to the control of an atmosphere "scrubbing" device so that the concentration of a given gas will be automatically maintained at an acceptable level.

More particularly, this invention in the preferred embodiment employs a pH sensitive dye solution suspended in a gel substance such as agar in a generally disk-shaped configuration hereinafter sometimes referred to as the "sensing disk." A light source illuminates this disk on one side while a light detector such as a photocell detects the light which passes through the disk from the light source. Then by continuously flowing the gas to be tested over the disk, the optical density of the disk will depend upon the presence of acidic or basic-forming constituents in the flowing gas. Thus the amount of light reaching the detector will be a function of the pH of the pH sensitive dye solution. Of course the life of the sensing disk depends upon how long the moisture content can be retained therein and accordingly it has been found that the separation of the flowing gas from the sensing disk by a semi-permeable membrane may often be desirable.

It has also been found that the optical density of some pH sensitive dyes will vary in a substantially linear inverse proportion to the pH of the solution present at certain wavelengths of light. Thus to provide a linear and accurate calibration of the output indication caused by the light passing through the sensing disk, it is advantageous to use a light filter that only allows the desired wavelength of the light to pass through the device.

The novel features that are considered characteristic of this invention are set forth with particularity in the appended claims. The invention, however, both as to its organization and method of operation as well as additional features and advantages thereof will be best understood from the following description when read in connection with the accompanying drawings in which:

Figure 1:
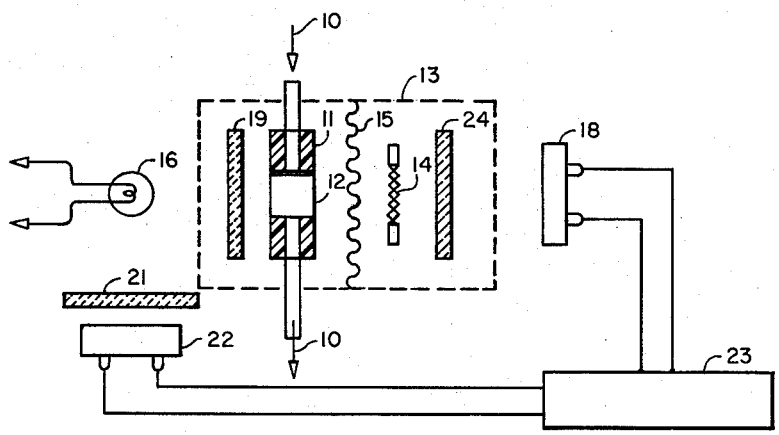
FIGURE 1 is an illustration of one embodiment of the present invention.

FIGURE 1 reveals a relatively simple embodiment of the basic components of this invention with some improvement features included. In this arrangement, the gas to be tested 10 is continuously introduced to venting means 11 which in turn has an open port 12 for communicating the gas internally to the sensing components. The sensing components are enclosed within a gas-tight container 13. The sensing disk 14 comprises a gel substance such as agar in which is suspended a pH sensitive dye whose transparency depends upon the pH of the solution in contact with the dye. Thus the gel substance must also have suspended therein a portion of a neutral solution which will dissolve soluble gases. A common such neutral solution is water of course.

It is obviously possible to place the sensing disk 14 directly in the stream of the flowing gas 10 thus allowing samples of any soluble gases to be absorbed directly into the solution suspended in sensing disk 14. However, this arrangement was found to cause the solution suspended in disk 14 to evaporate too rapidly thereby shortening the lift of the device. Accordingly, a practical means of increasing the life of the device and making it practical for extended usage has been found by including a semipermeable membrane 15 between sampling port 12 and the sensing disk 14. The membrane 15 passes the gas samples therethrough in either direction so that the atmosphere surrounding disk 14 will be substantially the same as that flowing through venting means 11. For reasons that will be apparent hereinafter, membrane 15 should also be substantially transparent if employed in an arrangement such as FIG. 1. However, once this invention is understood, other arrangements wherein the membrane 15 need not be transparent will be apparent to one having normal skill in the art.

A light source 16 is arranged so that light rays originating therefrom will pass through port 12, membrane 15 and sensing disk 14. A light detector 18 such as a photocell is then positioned to be actuated by rays which are passed through sensing disk 14.

To understand the basic operation of this invention, consider the operation of a device which, by way of example only, could be designed to function as a carbon dioxide sensor. The gas 10 containing a percentage of $CO_2$ is passed continuously through the sampling or venting means 11. Some of gas 10 will pass through port 12 and thence come into contact with sensing disk 14. Part of the $CO_2$ in gas 10 will then dissolve into the gel substance thus creating an acidic solution. The transparency of the pH sensitive dye will then change which in turn will change the amount of light passing therethrough from source 16 and actuating detector 18. Thus in the cabin of a space vehicle, the mere variation of the output of detector 18 can be utilized as an indication of the presence of $CO_2$ in the atmosphere. From the foregoing it can be seen that the essential components of the embodiment of this invention shown in FIG. 1 are light source 16, sampling means 11, sensing disk 14 including the pH sensitive dye suspended therein, gas tight container 13 and light detector 18.

The embodiment shown in FIG. 1 contains several features in addition to the aforementioned essential components, and one of these additional features is the semipermeable membrane 15 mentioned hereinbefore. Another feature which may be highly desirable to increase the accuracy of the device is light filter 19. It has been found that the absorption spectrum of certain pH sensitive dyes is such that the optical density of a solution containing such a dye varies in substantially linear inverse proportion to the pH of the solution. Thus the purpose of filter 19 is to insure that light rays at only the desired wavelengths will actuate detector 18 after having originated from source 16 and passed through sensing disk 14. By this arrangement, not only is the output from detector 18 an indication of the presence of a certain gas in the input gas 10 but the magnitude of the output from detector 18 can be accurately calibrated to provide an index of the relative concentration of the gas being monitored. For instance, if the gas to be monitored is carbon dioxide, an increase in the percentage concentration of the $CO_2$ in the gas 10 will lower the pH of the solution suspended in sensing disk 14 and thus change the light absorption characteristics of the dye proportionately. This change in the light absorption characteristics for the dye will of course also change the amount of light reaching detector 18 and the output thereof will change accordingly.

Thus it can be seen that a simple comparator device can be employed to provide an automatic indication of the $CO_2$ concentration of the gas to be monitored. In the embodiment of FIG. 1, a typical such comparator circuit is shown comprising light filter 21, light detector 22 and comparator circuit 23. In FIG. 1, filter 21 is substantially identical to filter 19 and detector 22 is substantially identical to detector 18. By this arrangement, any variation in the light originating from source 16 will be sensed in detector 22 and thus variations in the output of detector 18 can be compensated for in comparator 23 whenever such variations are the result of changes in source 16. It should be realized of course that detector 22 could be positioned so as to be actuated by the light passing through filter 19 from source 16 thereby removing the necessity for filter 21 as a separate entity. Element 24 is a clear window which could be part of the gas tight container 13.

Figure 2:
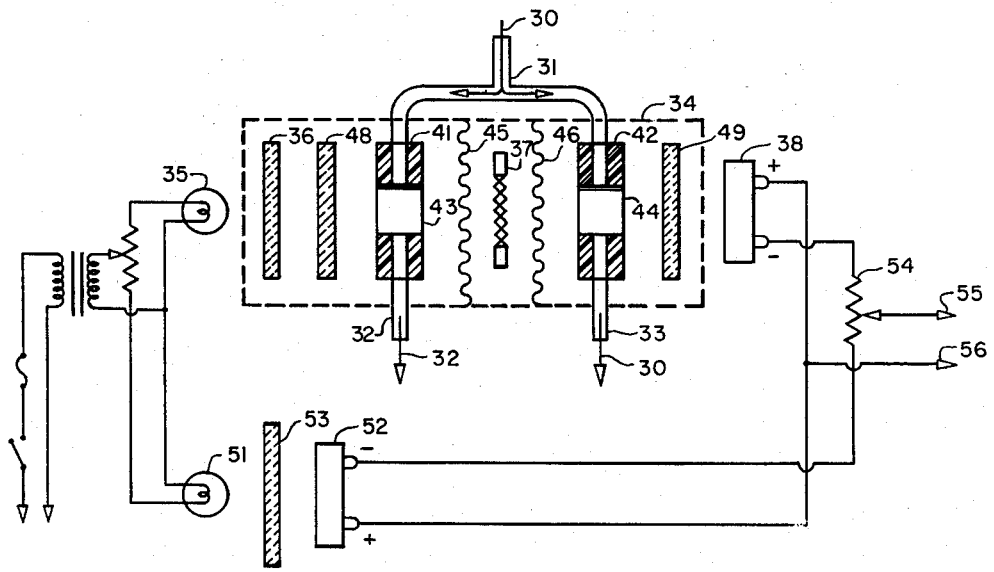
FIGURE 2 is an illustration of another embodiment of the present invention.

FIGURE 2 illustrates another embodiment of this invention incorporating some variations and improvements over FIG. 1. In FIG. 2, the gas 30 to be analyzed is introduced to the device through split tube arrangement 31 and is exhausted through tubes 32 and 33. Obviously the flow of gas 30 could be reversed if this should be desired. The components are enclosed in gas tight container 34. Light source 35, light filter 36, sensing disk 37 and detector 38 operate substantially the same as their counterparts in FIG. 1 and accordingly a detailed description of these components will be omitted for FIG. 2. FIG. 2 includes two gas sampling or venting means 41 and 42 having ports 43 and 44 therein respectively for communicating gas 30 to the interior of container 34. However, sensing disk 37 is substantially isolated from ports 43 and 44 by two semi-permeable membranes, the inclusion of two venting means 41 and 42 with membranes 45 and 46 is for the purpose of increasing the response time of the device by introducing gas 30 to both sides of sensing disk 37. Window 48 is a transparent means which normally would be mounted as part of container 34. In some arrangements, the sealing function of window 48 could be left out entirely. However, it may be desirable to interchange filters for filter 36 and this probably would be accomplished by mounting filter 36 externally to container 34. Window 49 is also for sealing purposes and would generally be part of container 34.

Light source 51 is powered by the same power source as source 35 and is arranged to illuminate detector 52 via filter 53. Thus if there is substantial interchangeability between sources 35 and 51, filters 36 and 53, and detectors 38 and 52, then the output of detector 52 can be employed as a reference for comparison with the output of detector 38. One simple arrangement for accomplishing this comparison operation is shown in FIG. 2 by means of resistor 54. Thus when gas 30 contains no constituent capable of changing the pH at sensing disk 37 from neutral (i.e., a pH of 7), then the outputs of detectors 38 and 52 can be balanced providing no output at terminals 55 and 56. Whenever the light passing through sensing disk 37 decreases, the output of detector 38 will decrease creating a unbalance voltage at terminals 55 and 56. This unbalance voltage can then be calibrated to determine the concentration of the constituent in gas 30 that is being monitored.

Figure 3:
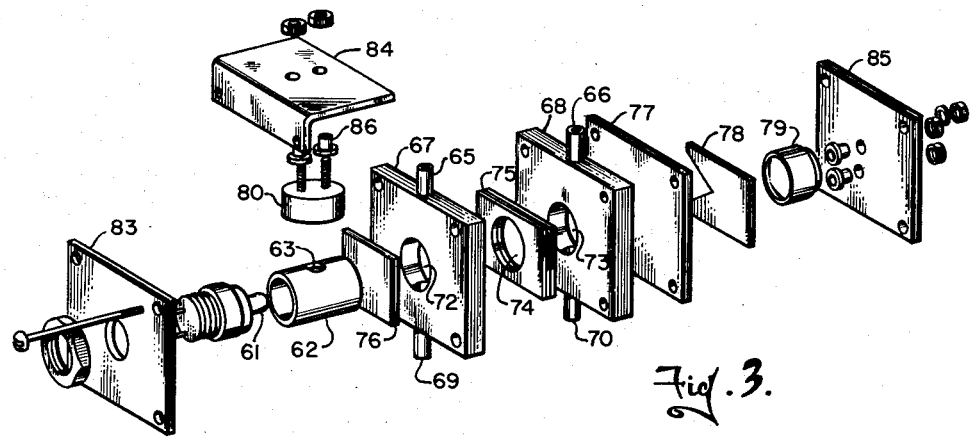
FIGURE 3 is an exploded view of a device actually constructed in accordance with this invention.

FIGURE 3 illustrates an exploded view of a device actually consrtucted and successfully tested in accordance with the present invention for purposes of atmospheric $CO_2$ monitoring. In FIG. 3, the light source is shown as lamp 61 and is mounted in sleeve 62 which allows the light to shine along the control axis of the device and also through port 63. The gas to be monitored is introduced to tubes 65 and 66, passes through sampling or sensing means 67 and 68, and is exhausted through tubes 69 and 70. The gas is introduced internally to the device by means of ports 72 and 73. The sensing disk containing the pH sensitive dye is mounted within the port 74 in container 75. Light filter 76 and plexiglass window 77 then form a gas tight seal for the device. Wedge 78 is not transparent and is included in the light path of the sensor to provide a fine balance control for calibration. The light passing through the sensor is detected by photocell 79 which will produce an output volatge in proportion thereto. Photocell 80 is included for reference or comparator purposes substantially as described for FIGURES 1 and 2. Port 63 could include a filter element similar in characteristics to filter 76. The purpose of the remaining structure including mounting plates 83, 84 and 85 and insulating spacers such as 86 is obvious.

Figure 4:
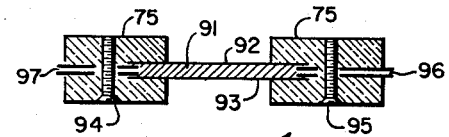
FIGURE 4 is a section view of the dye retaining arrangement of FIGURE 3.

Consider next FIGURE 4 which more clearly illustrates the structure of container 75. In particular, the device actually built contained a pH sensitive dye suspended in a gel substance 91. The pH sensitive dye found to be most satisfactory for $CO_2$ monitoring purposes is that known as Bromcresol Green which will be described in more detail hereinafter. Semi-permeable membranes 92 and 93 were made up of ½ mil clear polytetrafluoroethylene (Teflon) film. Container 75 was made of two plates held together by screws 94 and 95 in a clamp arrangement. The gaps 96 and 97 were sealed with an adhesive coated polytetrafluoroethylene (Teflon) film. By this arrangement, the dye containing element can be constructed in the form of a removable core of facilitate replacement. For the device shown in FIG. 3, polytetrafluoroethylene (Teflon) films having a thickness of .001 inch and .0005 inch were tested and both were found to allow diffusion of $CO_2$ into the dye solution at reasonable rates.

In the investigations for the $CO_2$ monitoring device of FIGURE 3, it was found that two possible pH sensitive dyes could be used. One such dye is known in the art as Methyl Red which has a pH range of 4.2 to 6.3 changing from red for acidic solutions to yellow on the basic side. As mentioned, the dye found most suitable for the $CO_2$ sensor was Bromcresol Green which has a pH range from 3.8 to 5.4 but which changes from yellow in the acidic form to blue in the basic form. Bromcresol Green technically comprises $3',3'',5',5''$-tetrabromo-metacresolsulfonephthalein and is available commercially in powder form as Eastman Kodak #1782. More detailed data and discussion of Bromcresol Green can be obtained from the book entitled "Physical Chemistry," by F. T. Gucker, Jr. and W. B. Meldrum (American Book Co., New York, N.Y., 1942), chapter 17 in particular.

Figure 5:
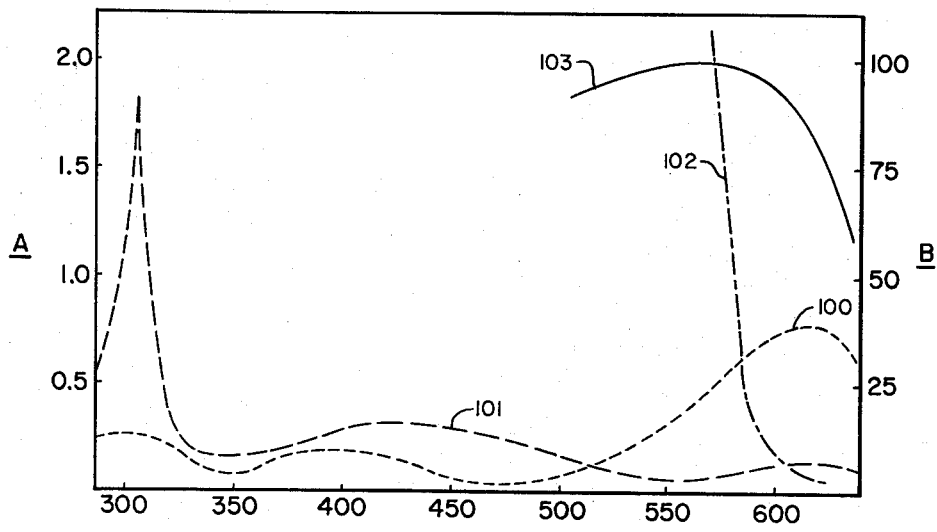
FIGURE 5 is a graph of the optical characteristics of a $CO_2$ sensing device constructed in accordance with FIGURE 3.

Experimentation with Bromcresol Green produced the results shown in FIGURE 5. In FIG. 5, the optical density of the dye is plotted on index A vertically along the left side, wavelength is plotted in milli-microns along the horizontal axis, and index B vertically along the right side is the relative sensitivity of the International #A-5-M photocell used. Curves 100 and 101 represent the optical density of Bromcresol Green at a pH of 7 and a pH of 4 respectively for the wavelengths of light plotted along the horizontal axis. Curve 102 is the optical density of the filter used, a Corning #2-73 sharp cut-off red filter, plotted against wavelength. Observing this graph, it can be seen that two very desirable points of the optical density curves 100 and 101 occur, one at about 302 m$\mu$ and another at about 640 m$\mu$. The differential between pH 4 and pH 7 is greater for 302 m$\mu$ but the peak at 640 m$\mu$ was found to be more practical for two reasons. First an extremely narrow filter would be required for 302 m$\mu$ as compared to 640 m$\mu$. This is because the red cut-off filters for all wavelengths below about 560 m$\mu$ are readily available and selenium barrier layer photocells (such as International #A-5-M) falls off rapidly at wavelengths longer than 620 m$\mu$ (note curve 103). Thus the combination of these photocells and the red filter creates a convenient optical "slot" or narrow-band filter.

The second reason for choosing the absorption band for the basic form of dye is that the concentration of this form is diminished with increasing acidity so that transmission of light and thus photocell output is an increasing function with respect to increasing carbon dioxide partial pressures. In obtaining the data for FIGURE 5, a standard solution of Bromcresol Green was used comprising one-tenth ml. if 0.0001 molar Bromcresol Green added to 5 ml. of standard buffer. Thus the total concentration of dye was $1.96 \times 10^{-4}$ M.

Returning to consideration of the device shown in FIG. 3, when an aqueous solution of the dye was placed in the container 75, it was found that evaporation occurred at a fairly high rate when the rate of flow of dry gas through the cell was on the order of 50 to 200 cc. per minute. The useful life of the cell was extended by preparing the dye solution in approximately half saturated calcium chloride and gelling the solution with 2% agar (a complex polysaccharide used to solidify bacteriological media). The resultant solution is a moist solid or gel substance at ordinary temperatures. The inclusion of 2% agar was found to have little effect on the response time of the sensor. The output of a given photocell employed in the device shown in FIG. 3 can be determined from the following equation $$mv = K(T_2 - T_1)$$

where:

$mv$ = output voltage in millivolts,
$K$ = proportionality constant characteristic of a particular cell and lamps setting,
$T_1$ = theoretical value of T (transmittance) at pH 7,
$T_2$ = theoretical value of T at any other value of partial pressure for the monitored gas.

The transmittance T is defined as:

$$T = \frac{1}{\text{antilog } d}$$

where $d$ = optical density.

A defining equation for optical density of a solution of dye as a function of the partial pressure of $CO_2$ at a given temperature has been found to be:

$$d = \epsilon_{[I_n^-]} \left\{ \frac{[HI_a] + [I_n^-]}{1 + Z\left[K_a\left(\frac{PCO_2}{760} \cdot \frac{\alpha CO_2}{22.4}\right)\right]^{1/2}} \right\}$$

where:

$\alpha$ = ml. of gas dissolved in 1 ml. water,
$K_a$ = dissociation constant,
$[I_n^-]$ = molar concentration of ionized dye,
$[HI_a]$ = molar concentration of un-ionize ddye,
$PCO_2$ = partial pressure of $CO_2$,
$Z$ = antilog $K_{in}$, and
$\epsilon$ = molar extinction coefficient at a given wavelength Although the defining equation for $d$ is seen to be generally nonlinear, the function is fortunately most sensitive and substantially linear in the area of greatest interest. For instance, for carbon dioxide, this is the range of partial pressures from zero to 10 mm. Hg.

Many possible variations of the elements of this invention will be obvious to one having normal skill in the art without departing from the spirit of this invention. For instance, there has been no effort to present an exhaustive study of all of the possible pH sensitive dyes that could be utilized.

Although the invention has been described herein with particularity, it is to be understood that the invention is not limited to the exact form or use indicated.

What we claim as our invention is:

1. A device for continuously analyzing a flowing gas comprising a gel substance, a pH sensitive dye suspended in said gel substance, said gel substance including therein means for absorbing soluble gases to control the transparency of said dye, gas venting means connected for allowing passage therethrough of the gas to be analyzed, and having at least one port communicative with the gas passing through said venting means, semi-permeable membrane means separating the gas present at said port from said pH sensitive dye but allowing gas to pass therebetween, means for isolating the atmosphere surrounding the gel substance from all gases except those passing through said port, light source means for illuminating said pH sensitive dye, a detector means actuated only by light originating from said light source and passing through said dye, and filter means constructed and positioned for allowing the light actuating said detector means to occur only at the wavelengths at which the optical density of said dye is substantially linearly proportional to the pH of the solution in said gel substance whereby the output of said detector means will provide an indication of the presence and relative amount of certain constituents in the flowing gas.

2. A device in accordance with claim 1 which includes a second detector means positioned to be actuated by light emanating directly from said light source means, and means for comparing the outputs of the two said detector means whereby said device can be calibrated.

3. A device in accordance with claim 2 in which said filter means is positioned between said light source and said pH sensitive dye, and said second detector means is positioned for actuation by the light passing through said filter means only.

4. A device for continuously analyzing a flowing gas comprising, a gel substance including therein means for absorbing soluble gases, a pH sensitive dye having a transparency dependent upon the pH factor of solutions in association therewith, said dye being suspended in said gel substance, gas venting means including at least one pair of ports for passing the gas to be analyzed therethrough and at least one intermediate port communicative with the gas passing through said venting means, semipermeable membrane means for allowing gas to pass therethrough and being arranged between said intermediate port and said gel substance, means for isolating the atmosphere around said gel substance from all gases except the gases passing through said membrane means, a light source for illuminating said gel substance, and means for detecting the light passing through said gel substance from said light source, whereby an indication of the presence and relative amount of pH effecting constituents in the flowing gas is produced.

References Cited in the file of this patent
UNITED STATES PATENTS

| | | |
|---|---|---|
| 2,800,397 | Offutt et al. | July 23, 1957 |
| 2,880,073 | Lupfer et al. | Mar. 31, 1959 |

FOREIGN PATENTS

| | | |
|---|---|---|
| 820,293 | Great Britain | Sept. 16, 1959 |